Sept. 6, 1960 R. HARPER 2,951,477
WATERING TANK HEATING UNIT
Filed April 8, 1958 2 Sheets-Sheet 1

INVENTOR.
ROY HARPER
BY
McMorrow, Berman + Davidson
ATTORNEYS

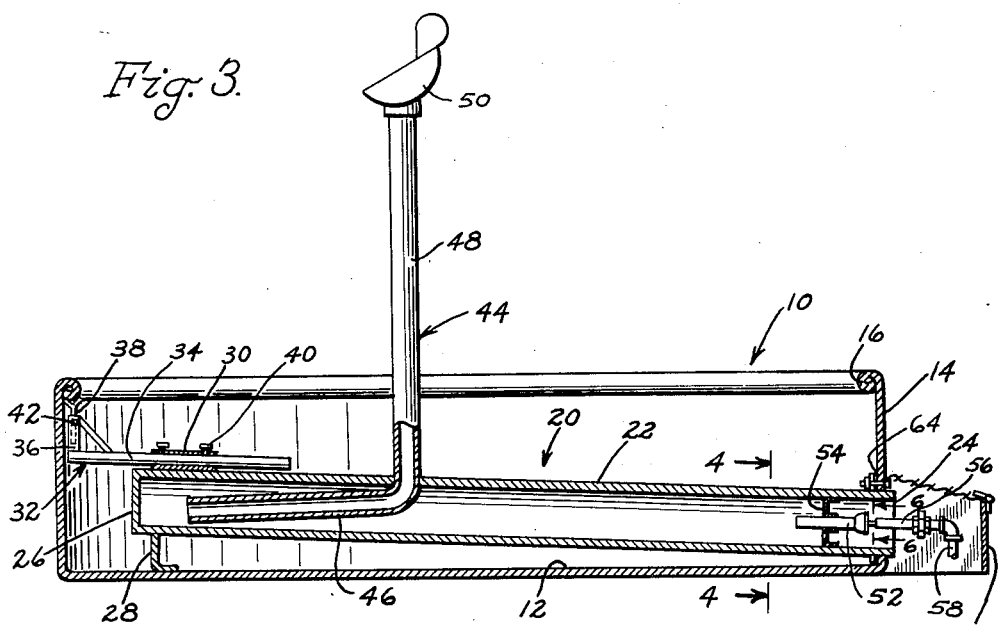
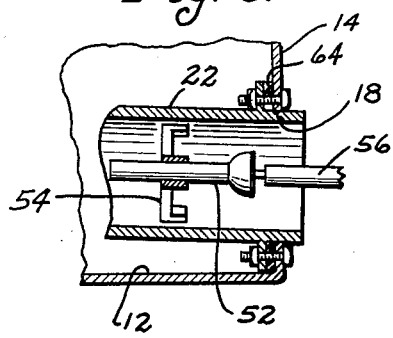
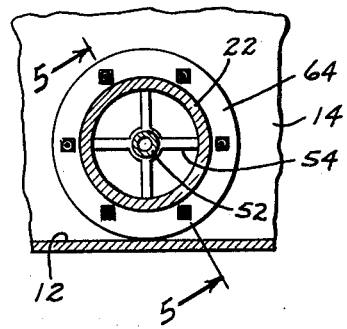
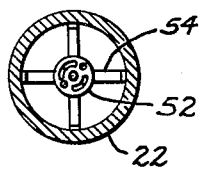

United States Patent Office 2,951,477
Patented Sept. 6, 1960

2,951,477
WATERING TANK HEATING UNIT
Roy Harper, 1109 College St., Scott City, Kans.
Filed Apr. 8, 1958, Ser. No. 727,138
1 Claim. (Cl. 126—360)

The present invention relates to a heating unit for a stock watering tank.

An object of the present invention is to provide a heating unit for installation in a stock watering tank which lends itself for use with tanks of varying diameters, one which is readily installed in a tank and readily removed therefrom, and one which is highly efficient in action.

Another object of the present invention is to provide a heating unit for a stock watering tank which has relatively long-like characteristics, one which does not readily rust from the products of combustion, and one which is so arranged as to not be disturbed by the cattle when drinking from the stock watering tank in which the unit is installed.

These and other objects and advantages of the present invention will be fully apparent from the following description when taken in conjunction with the annexed drawings, in which:

Figure 3 is a view taken on the line 3—3 of Figure 1;

Figure 4 is a fragmentary sectional view of a portion of the unit, taken on the line 4—4 of Figure 3 and on an enlarged scale;

Figure 5 is a view taken on the line 5—5 of Figure 4; and

Figure 6 is a view, on an enlarged scale, taken on the line 6—6 of Figure 3.

Figure 1:
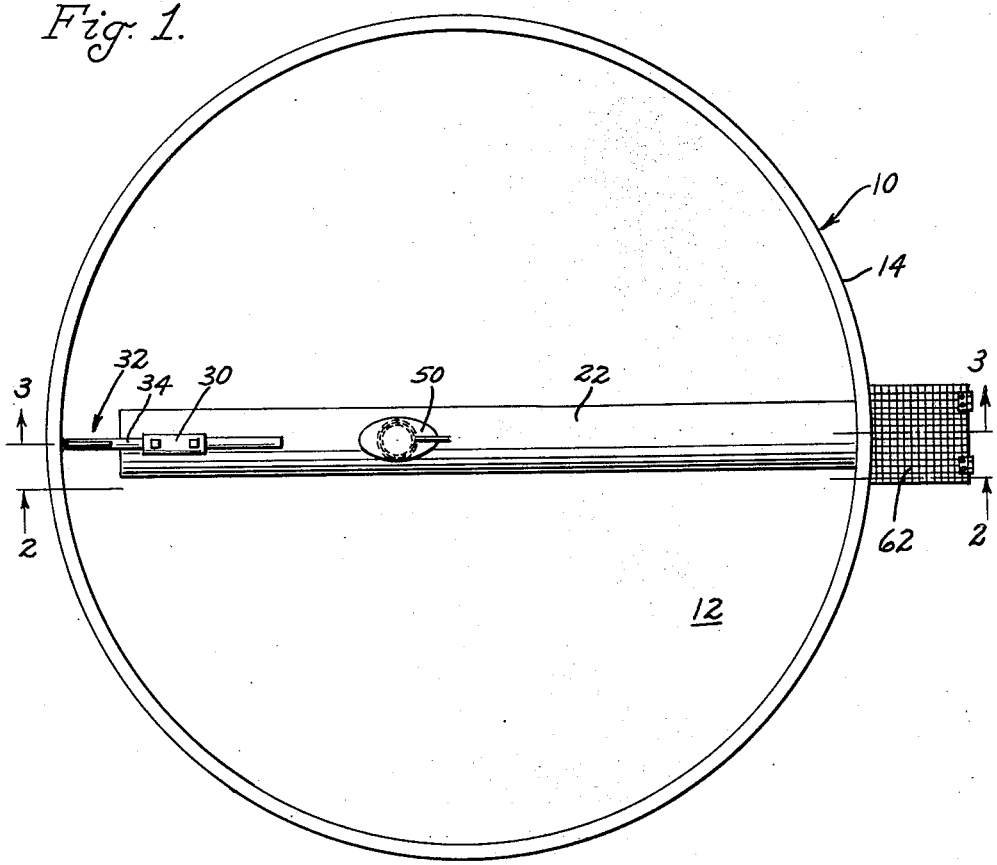
Figure 1 is a plan view of the unit of the present invention installed within a circular stock watering tank.
Figure 2:
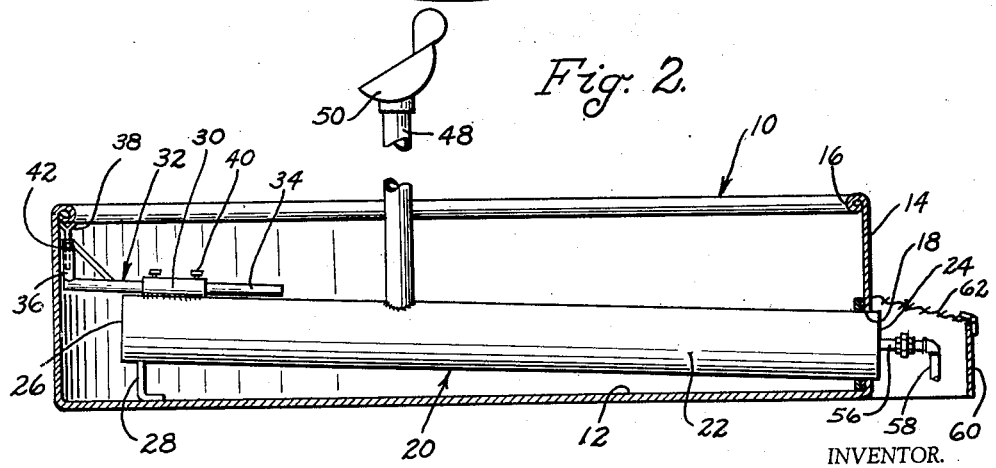
Figure 2 is a view taken on the line 2—2 of Figure 1.

Referring in greater detail to the drawings in which like numerals indicate like parts throughout the several views, the stock watering tank heating unit according to the present invention is for installation within a tank 10 having a flat bottom 12 and a wall 14 extending about and rising from the perimeter of the bottom 12. A rolled rim 16 projects inwardly from the upper end of the wall 14. The wall 14 has an aperture 18 adjacent the bottom 12.

The water heating unit of the present invention is designated generally by the reference numeral 20 and includes a tube 22 having an open end 24 and a closed end 26. The tube 22 is positioned within the tank 10 so that the open end 24 projects through the aperture 18 and the remaining part of the tube 22 slopes upwardly toward a point in the tank wall 14 opposite the aperture 18.

A vertically disposed leg 28 is positioned beneath the tube 22 adjacent the closed end 26 and has its upper end fixedly secured to the underside of the adjacent tube portion. The lower end of the leg 28 rests upon the tank bottom 12.

A sleeve 30 extends longitudinally of the tube 22 and is fixedly secured to the portion of the tube adjacent the closed end 26.

An L-shaped support 32 is positioned above the portion of the tube 22 adjacent the closed end 26 and has its long leg 34 slidably mounted within the sleeve 30.

The short leg 36 of the support 32 projects in an upright direction and is tubular with an auxiliary support member 38 telescopingly arranged within the free end thereof, the upper end of the member 38 being bifurcated and bearing against the underside of the tank rim 16, as shown most clearly in Figure 3. Bolts 40 and 42 extend through the sleeve 30 and the short leg 36 of the support 32, respectively, and form means by which the support 32 may be adjusted relative to the tank wall 14 and the auxiliary support member 38 adjusted relative to the depth of the tank.

An L-shaped vent 44 is positioned with its short leg 46 within the tube 22 with the open end thereof facing and spaced from the closed end 26 of the tube 22. The long leg 48 of the vent 44 projects vertically out of the tank 10 and has its upper end capped by a rotatable wind cap 50.

Burner means is installed within the tube 22 inwardly of the open end 24. Specifically, the burner means includes an air mixing tube 52 arranged longitudinally of the tube 22 and supported in a spider 54 which has auxiliary openings therethrough for the admission of combustion air to the interior of the tube 22. A gas tube 56 is arranged in axial relation with respect to the mixing tube 52 and has a dispensing nozzle of conventional construction on one end thereof adjacent the inlet end of the mixing tube 52. A pipe or conduit 58 has one end connected to the gas tube 56 and its other end connected to a source of gaseous fuel under pressure, the latter not being shown as not being a part of the present invention.

A rigid housing 60 is positioned exteriorly of the tank 10 and extends over the projecting end portion of the gas tube 56 and the associated conduit 58. The housing 60 has a reticulated top 62 permitting air to enter therethrough. A packing gland and sealing ring assembly 64 surrounds the open end of the tube 22 and sealingly secures it in the aperture 18.

In operation, the conduit 58 is connected to a source of gaseous fuel under pressure, such as butane, propane, or other liquefied petroleum gas commercially available. Upon burning of the gas in the gas-air mixing tube 52, the tube 22 is heated and the heat is conducted to the water within the tank 10 with the combustion products escaping through the vent 44. The tube 22 slopes to the exterior of the tank 10 and any condensing vapors resulting from combustion of the gas within the tube 22 flow readily to the ground in the area of the housing 60. It has been found that such condensed vapors are absorbed readily by the ground beneath the housing 60 for the reason that the burner unit warms the ground sufficiently to permit absorption of such condensed vapors. The long leg 48 of the vent 44 is so positioned relative to the wall 14 of the tank 10 that cattle and stock watering at the tank 10 do not disturb the vent 44.

The L-shaped support 32 is adjustable in the sleeve 30 for accommodation of the unit 20 in tanks of various sizes and the auxiliary support member 38 is adjustable vertically in the short leg 36 of the support 32 so as to serve as a "hold-down" for the tube 22 which is inherently buoyant when the tank 10 is filled to its normal capacity with water.

It has been found that the burner unit of the present invention when installed as heretofore described within a stock watering tank will keep the water within the tank at such a temperature that the stock will water quickly.

What is claimed is:

The combination with a tank including a flat bottom and a wall extending about and rising from the perimeter of said bottom, a rim projecting inwardly from the upper end of said wall, said wall having an aperture adjacent said bottom, of a water heating unit comprising a tube having one end open and the other end closed positioned in said tank so that the open end projects through the wall aperture and the remaining part of said tube extends in an upwardly sloping direction toward a point in said wall opposite said aperture with the closed end of said tube inwardly of and spaced from said point, a vertically disposed leg positioned beneath said tube adjacent the closed end and having the upper end fixedly attached to said tube and having the lower end resting upon said tank bottom, a sleeve extending longitudinally of and fixedly secured to the portion of said tube adjacent said closed end, an L-shaped support having its long leg slidably mounted in said sleeve and having its short leg extending in an upright direction with the free end of said short leg beneath and bearing against the underside of said rim, an L-shaped vent positioned so that its short leg is within said tube with the open end facing and spaced from the closed end of said tube and the long leg projecting vertically out of said tank and having its upper end capped by a wind cap, and burner means positioned inwardly of the open end of said tube.

References Cited in the file of this patent

UNITED STATES PATENTS

| | | |
|---|---|---|
| 487,806 | Weed | Dec. 13, 1892 |
| 793,472 | Thorbus | June 27, 1905 |
| 1,760,309 | Marrits | May 27, 1930 |
| 2,289,817 | Williams et al. | July 14, 1942 |
| 2,515,618 | Wallerius | July 18, 1950 |
| 2,560,695 | Huber | July 17, 1951 |
| 2,606,548 | Clifford | Aug. 12, 1952 |
| 2,617,407 | Johnson | Nov. 11, 1952 |

FOREIGN PATENTS

| | | |
|---|---|---|
| 512,908 | Germany | Nov. 20, 1930 |